United States Patent [19]

Suzuki

[11] Patent Number: 5,161,652

[45] Date of Patent: Nov. 10, 1992

[54] VENTILATED DISK BRAKE ROTOR

[75] Inventor: Tsuguya Suzuki, Saitama, Japan

[73] Assignee: Honda Giken Kogyo Kabushiki Kaisha, Tokyo, Japan

[21] Appl. No.: 769,564

[22] Filed: Oct. 2, 1991

Related U.S. Application Data

[63] Continuation of Ser. No. 422,722, Oct. 17, 1989, abandoned.

[30] Foreign Application Priority Data

Oct. 18, 1989 [JP] Japan ................. 63-262382

[51] Int. Cl.$^5$ ............................................ F16D 65/12
[52] U.S. Cl. ............................ 188/218 XL; 188/18 A
[58] Field of Search .............. 188/218 XL, 17, 18 R, 188/18 A, 264 A, 264 AA, 64, 71.6, 58, 26, 218 R; 301/6 CS, 6 W, 6 UB, 66, 80, 79, 74; 192/113 A, 76.12; 295/33, 26, 34

[56] References Cited

U.S. PATENT DOCUMENTS

| 2,242,855 | 5/1941 | Flowers ........................ 188/218 XL |
| 2,380,085 | 7/1945 | Tack et al. .................... 188/218 XL |
| 2,423,056 | 6/1947 | Tarbox .......................... 188/218 XL |
| 2,473,040 | 6/1949 | Schlegel ........................ 188/264 A |
| 3,661,235 | 5/1972 | Harrison ....................... 188/218 XL |
| 4,177,883 | 12/1979 | Margetts ...................... 188/218 XL |
| 4,281,745 | 8/1981 | Wirth ............................ 188/218 XL |

FOREIGN PATENT DOCUMENTS

| 3335807 | 4/1985 | Fed. Rep. of Germany ...... 188/218 XL |
| 2485667 | 12/1981 | France ........................ 188/218 XL |
| 52-50471 | 4/1977 | Japan . |
| 63-146237 | 9/1988 | Japan . |
| 2108238 | 5/1983 | United Kingdom ......... 188/218 XL |
| 2211253 | 6/1989 | United Kingdom ......... 188/264 AA |

Primary Examiner—Matthew C. Graham
Attorney, Agent, or Firm—Nikaido, Marmelstein, Murray & Oram

[57] ABSTRACT

The invention is directed to a ventilated disk brake rotor made of integrally cast metal or allow that includes a central hub having a cylindrical main part, and a pair of friction plates extending radially from the central hub in parallel with one another. The friction plates are disposed in mutually spaced apart relationship by use of a plurality of radial ribs. Further, the friction plates are directly attached to an outer circumferential surface of the cylindrical main part of the central hub at their base ends. As a result, the generation of cracks and premature wear are prevented through the increased rigidity of the friction plates without an increase in the weight of the disk brake rotor.

9 Claims, 2 Drawing Sheets

VENTILATED DISK BRAKE ROTOR

This application is a continuation of application Ser. No. 422,722 filed Oct. 17, 1989 now abandoned.

TECHNICAL FIELD

The present invention relates to a ventilated disk brake rotor comprising a central hub and a pair of friction plates disposed around the central hub and spaced apart from each other by radial ribs for improved cooling effect.

BACKGROUND OF THE INVENTION

Most high-performance automobiles are equipped with disk brakes in which a disk brake rotor rotating integrally with the wheel is selectively gripped by a pair of brake pads. In order to dissipate friction heat not only from the outer surface of the disk brake rotor but also from the interior of the disk brake rotor, a plurality of radial slots are defined between the pair of friction plates which are connected to each other by a plurality of radial ribs, as disclosed, for instance, Japanese patent laid-open publication No. 52-50471. Since air flows through these radial slots at a significant flow rate due to the centrifugal force induced by the rotation of the disk brake rotor, a significant improvement in cooling efficiency may be achieved.

However, according to conventional disk brake rotors, only one of the friction plates is directly attached to the central hub while the other friction plate is attached to the one friction plate by way of radial ribs defining radial slots. According to such a structure, it is difficult to ensure the rigidity of the friction plates disposed around the central hub, and to control waviness of the friction surfaces. Such a waviness causes uneveness in the pressure between the friction surfaces and the brake pads and could lead to various undesirable consequences, such as uneven wear of the brake pads, brake shudder, and premature wear and generation of cracks in the brake pads.

Japanese utility model laid-open publication No. 63-146237 discloses a disk brake rotor comprising a central disk which is directly attached to a central hub, and a pair of friction plates which are both integrally attached to the central disk by way of radial ribs. This disk brake rotor eliminates uneveness in the thermal and stress conditions of the two friction plates, but the provision of the central disk adds to the weight of the disk brake rotor.

BRIEF SUMMARY OF THE INVENTION

In view of such problems of the prior art, a primary object of the present invention is to provide an improved ventilated disk brake rotor which has a sufficient rigidity and can ensure a favorable smoothness of the friction surfaces.

A second object of the present invention is to provide a ventilated disk brake rotor which is highly rigid and free from problems in its casting process.

These and other objects of the present invention can be accomplished by providing: a ventilated disk brake rotor made of integrally cast metal or alloy, comprising: a central hub having a cylindrical main part; a pair of friction plates extending radially from the central hub in parallel with one another and disposed in mutually spaced apart relationship by means of a plurality of radial ribs; the friction plates being both directly attached to an outer circumferential surface of the main part of the central hub at their base ends.

Thus, the rigidity of the friction plates is increased, whereby such problems as uneven wear of the brake pads, occurrence of brake shudder, and premature wear and generation of cracks in the brake pads can be avoided.

According to a preferred embodiment, the central hub is provided with a plurality of radial holes extending entirely through the main part of the central hub so as to communicate the interior of the cylindrical main part of the central hub with radial passages defined between the ribs. Preferably, the ribs consist of first ribs which are connected with the main part of the hub and second ribs which are not connected with the main part of the hub, first and second ribs being disposed in alternating fashion, and the radial holes are provided on extension lines of the second ribs adjacent to the base ends of the second ribs. These radial holes are useful not only for improved cooling effect but also for easy removal of sand after casting process.

According to a particularly preferred embodiment, the base ends of both of the friction plates are provided with a plurality of axial openings communicating the radial passages defined by the ribs with the exterior of the brake rotor, the axial openings provided in one of the friction plates consisting of arcuate slots extending between the base ends of adjacent first ribs while the axial openings provided in the other friction plate consist of circular holes provided on either side of the base end of each of the first ribs. These axial openings are useful for improved cooling effect and easy removal of sand after the casting process particularly when they are combined with the radial holes.

BRIEF DESCRIPTION OF THE DRAWINGS

Now the present invention is described in the following with reference to the appended drawings, in which.

DETAILED DESCRIPTION OF THE PREFERRED EMBODIMENT

Figure 1:
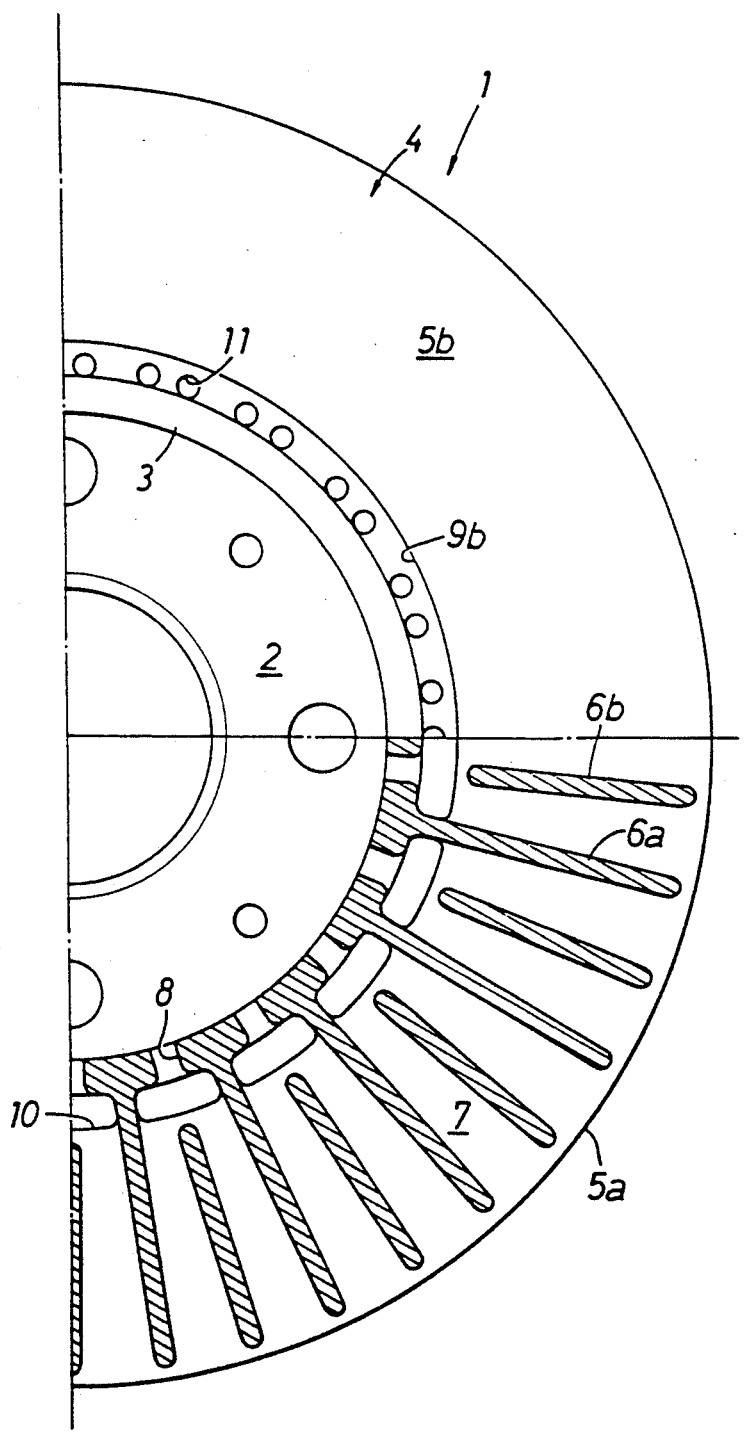
FIG. 1 is a front view of a right half of an embodiment of the disk brake rotor according to the present invention with its lower half shown in section.
Figure 2:
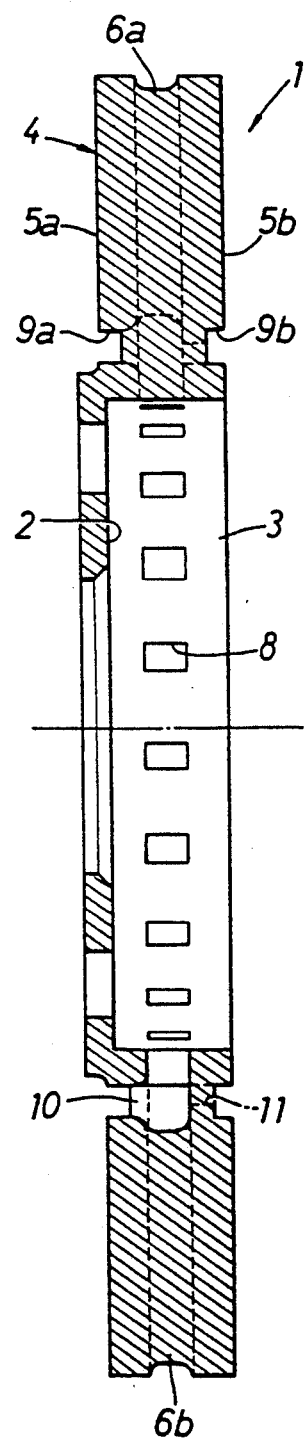
FIG. 2 is a sectional side view of the same.
Figure 3:
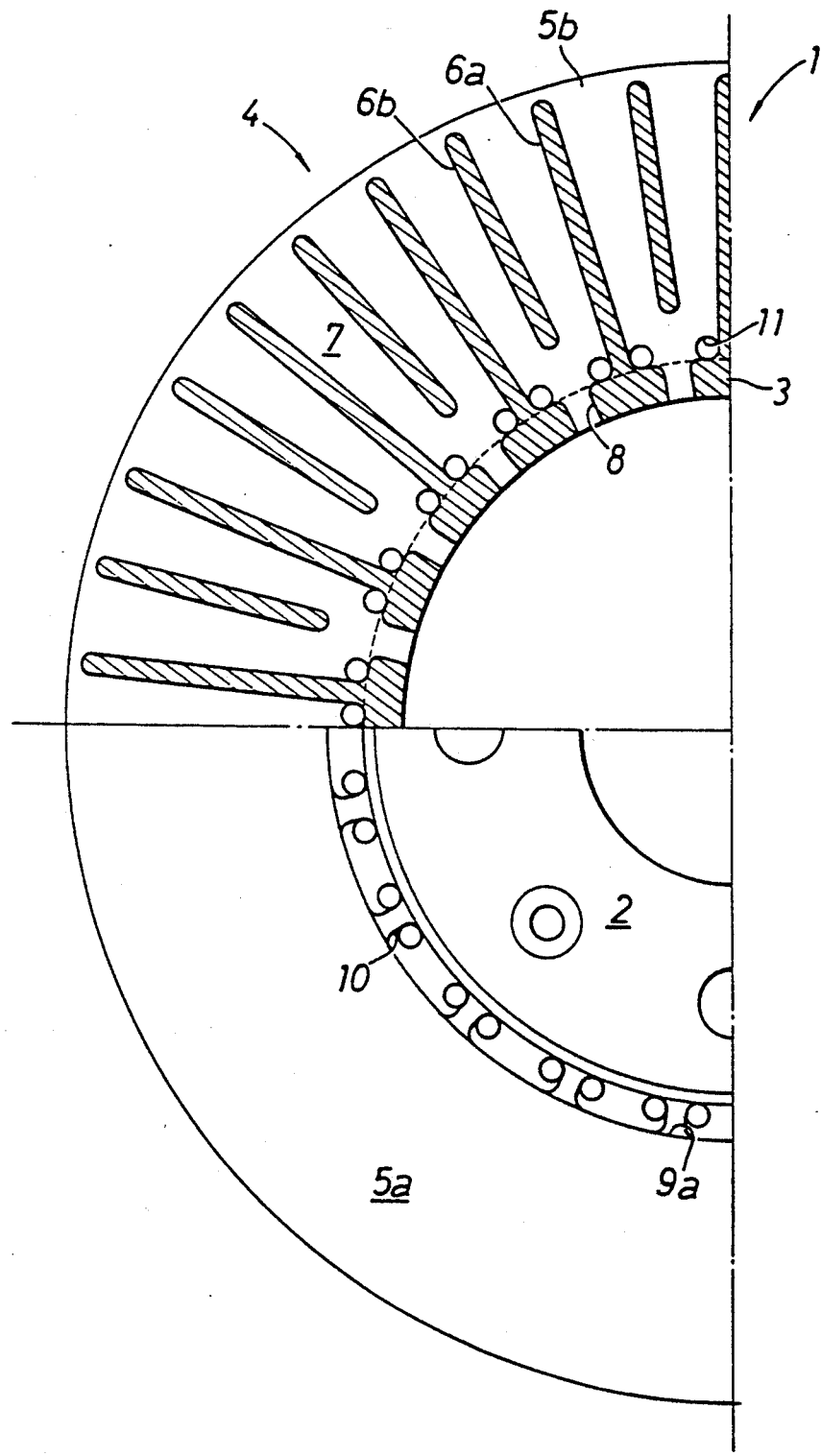
FIG. 3 is a rear view of the same with with its lower half shown in section.

Referring to FIGS. 1 through 3, the illustrated brake rotor 1 comprises a cup-shaped central hub 3 consisting of a cylindrical main part and an annular bottom part 2 for securing the brake rotor 1 to an axle not shown in the drawings. From the outer circumferential surface of the cylindrical main part extends an annular part 4 consisting of a pair of friction plates 5a and 5b axially spaced from each other by a plurality of radial ribs 6a and 6b defining a plurality of radial slots 7 therebetween.

The radial slots 7 are communicated with the interior of the central hub 3 of the brake rotor 1 by way of holes 8 extending radially through the cylindrical wall of the cylindrical central hub 3. The radial ribs consist of those connected with the cylindrical part of the central hub 3 and those which are not connected with the cylindrical part of the central hub 3, disposed in an alternating manner, and the holes 8 are located on extension lines of the radial ribs 6b which are not connected with the cylindrical part of the central hub 3.

A concentric annular groove 9a or 9b is provided in the base end region of the outer surface of each of the friction plates 5a and 5b. These grooves 9a and 9b reduce the influences of the thermal expansion due to the heat produced by the friction between the brake pads and the friction plates 5a and 5b on the brake rotor. The bottom end of the groove 9a of the outboard friction plate 5a is provided with a plurality of arcuate slots 10 which are communicated with the radial slots 7. Each of the slots 10 extends between the opposing surfaces of the base end portions of the adjacent ribs 6a which are connected with the central hub 3, in a concentric fashion. The bottom end of the groove 9b of the inboard friction plate 5b is provided with a plurality of small holes 11 each of which opposes an end portion of the associated one of the slots 10. These small holes 11 not only permit easy removal of sand after casting but also promote air flow through the slots 7.

According to a conventional disk brake rotor having a pair of friction plates, only one of the friction plates is directly attached to the central hub, and the other friction plate is attached to the one friction plate by way of radial ribs. In the case of a disk brake rotor having a central disk in addition to a pair of friction plates, only the central disk is directly attached to the central hub, and the friction plates are attached to the central disk by way of radial ribs. Therefore, it has not been easy to obtain a desired rigidity without increasing the weight of the disk brake rotor. On the other hand, according to the present invention, since both the friction plates are directly attached to the central hub, it is relatively easy to achieve a desired rigidity without increasing its weight.

The present invention is in no way limited by the above embodiment. For instance, the small holes 11 may be related to the slots 10 in slots 10 in different ways, and their size may be selected according the amount of air flow required for each application depending on the load of the disk brake. Optionally, the holes 8 may be omitted. In that case, it is desirable to provide openings comparable to the slots in both the friction plates in order to ensure a sufficient air flow in the radial slots 7.

Thus, the present invention can contribute to the prevention of generation of cracks and premature wear through increased rigidity of the friction plates without increasing the weight of the disk brake rotor.

What we claim is:

1. A ventilated disk brake rotor made of integrally cast metal or alloy, comprising:
   a central hub having a one-piece cylinder main part;
   a pair of friction plates extending radially from said central hub in parallel with one another and disposed in mutually spaced apart relationship;
   a plurality of first radial ribs located between inner surfaces of said pair of friction plates so as to hold said pair of friction plates in mutually spaced apart relationship, said plurality of first radial ribs having extensions between said central hub and said pair of friction plates so as to connect and be located between and along inner circumferential surfaces of each of said pair of friction plates with an outer circumferential surface of said central hub, the extensions being formed with left and right lateral edges which extend along an entire length of the left and right lateral edges into respective planes defined by each of said pair of friction plates, said friction plates being both directly attached to an outer circumferential surface of said one piece cylinder main part of said central hub at their base ends; and
   a plurality of second radial ribs located between the inner surfaces of said pair of friction plates and arranged to alternate with said plurality of first radial ribs so as to hold said pair of friction plates in mutually spaced apart relationship and to be spaced apart from said central hub at radially inner ends of said plurality of second radial ribs,
   said central hub being provided with a plurality of radial holes each defined to extend through the main part of said central hub in alignment with a radial extension line from each of said plurality of second ribs, and the plurality of radial holes allowing communication between an end pair of the one-piece cylinder main part of said central hub and radial passages defined between said plurality of first radial ribs.

2. A ventilated disk brake rotor according to claim 1, wherein a base end of at least one of the friction plates is provided with a plurality of axial openings communicating said radial passages defined by said ribs with the exterior of said brake rotor.

3. A ventilated disk brake rotor according to claim 1, wherein the base ends of both of said friction plates are provided with a plurality of axial openings communicating said radial passages defined by said ribs with the exterior of said brake rotor, said axial openings provided in one of said friction plates consisting of arcuate slots extending between the base ends of adjacent first ribs while said axial openings provided in the other friction plate consist of circular holes provided on either side of the base end of each of said first ribs.

4. A ventilated disk brake rotor according to claim 3, wherein said axial openings are provided at the bottoms of annular grooves provided at the base ends of said friction plates adjacent to said main part of said central hub.

5. A ventilated disk brake rotor as set forth in claim 1, wherein said disk brake rotor is formed as a one-piece cast structure.

6. A ventilated disk brake rotor as set forth in claim 1, wherein the left and right lateral edges of the extensions extend radially relative to an axial centerline of said disk brake rotor and substantially parallel to each other.

7. A ventilated disk brake rotor made of integrally cast metal or alloy, comprising:
   a cup-shaped central hub having a one-piece cylinder main part and an annular bottom part for securing said disk brake rotor to a rotatable object;
   a pair of friction plates extending radially and directly from an outer circumferential surface of said main part of said central hub in mutually parallel and spaced apart relationship; and
   a plurality of radial ribs located between inner surfaces of said pair of friction plates so as to hold said pair of friction plates in mutually spaced apart relationship, said plurality of radial ribs having extensions between said central hub and said pair of friction plates so as to connect and be located between and along inner circumferential surfaces of each of said pair of friction plates with an outer circumferential surface of said central hub, the extensions being formed with left and right lateral edges which extend along an entire length of the left and right lateral edges into respective planes defined by each of said pair of friction plates, said pair of friction plates being both provided with axial openings adjacent the main part of said central hub, said axial openings provided in one of said friction plates axially closer to said annular bottom part of said central hub being substantially larger than said axial openings provided in the other of said friction plates.

8. A ventilated disk brake rotor as set forth in claim 7, wherein said disk brake rotor is formed as a one-piece cast structure.

9. A ventilated disk brake rotor as set forth in claim 7, wherein the left and right lateral edges of the extensions extend radially relative to an axial centerline of said disk brake rotor and substantially parallel to each other.

* * * * *